United States Patent
McEntee (10) Patent No.: US 7,052,880 B2
(45) Date of Patent: *May 30, 2006

(54) REACTION CHAMBER ROLL PUMP

(75) Inventor: John F. McEntee, Boulder Creek, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/837,334

(22) Filed: Apr. 30, 2004

(65) Prior Publication Data

US 2004/0202580 A1    Oct. 14, 2004

Related U.S. Application Data

(63) Continuation of application No. 09/775,012, filed on Jan. 31, 2001, now Pat. No. 6,746,649.

(51) Int. Cl.
*C12P 19/34*    (2006.01)
*B01F 11/00*    (2006.01)

(52) U.S. Cl. .................. 435/91.2; 435/286.7; 422/102; 366/209; 366/213; 366/214

(58) Field of Classification Search ................ 422/102, 422/209; 435/91.2, 394, 286.7; 366/209, 366/213, 214

See application file for complete search history.

(56) References Cited

U.S. PATENT DOCUMENTS

| | | | | |
|---|---|---|---|---|
| 3,607,703 A | * | 9/1971 | Hadley | ...................... 204/213 |
| 4,911,816 A | | 3/1990 | Love et al. | |
| 5,116,483 A | | 5/1992 | Lander | |
| 5,162,237 A | | 11/1992 | Messenger et al. | |
| 5,914,273 A | | 6/1999 | Kok | |
| 5,945,334 A | | 8/1999 | Besemer et al. | |
| 6,140,044 A | | 10/2000 | Besemer et al. | |
| 6,309,875 B1 | * | 10/2001 | Gordon | ................... 435/287.2 |
| 6,350,609 B1 | | 2/2002 | Morozov et al. | |
| 6,613,529 B1 | * | 9/2003 | Bedilion et al. | ............... 435/6 |

* cited by examiner

*Primary Examiner*—David Redding (57) ABSTRACT

A method and system for circulating sample solution within a reaction chamber containing a microarray. The reaction chamber contains, on each side, a shallow vertical and a deep vertical well at the corners of the microarray. The vertical wells having a gap between the active surface of the microarray and the bottom of the reaction chamber are filled with sample solution. As the reaction chamber is rotated, sample solution from the deep vertical well displaces sample solution in the gap between the active surface of the microarray and the bottom of the reaction vessel, and sample solution from that gap is, in turn, displaced into the shallow vertical well, from which it flows along the inner surface of a cover strip above the microarray back to the deep vertical well.

20 Claims, 4 Drawing Sheets

REACTION CHAMBER ROLL PUMP

TECHNICAL FIELD

The present invention relates to small reaction chambers, such as a reaction chamber including a microarray within a microarray strip, and, in particular, to a method and system for circulating solutions within small sealed reaction chambers.

BACKGROUND OF THE INVENTION

Microarrays are widely used and increasingly important tools for rapid hybridization analysis of sample solutions against hundreds or thousands of precisely ordered and positioned features on the active surfaces of microarrays that contain different types of molecules. Microarrays are normally prepared by synthesizing or attaching a large number of molecular species to a chemically prepared substrate such as silicone, glass, or plastic. Each feature, or element, on the active surface of the microarray is defined to be a small, regularly-shaped region on the surface of the substrate. The features are arranged in a regular pattern. Each feature may contain a different molecular species, and the molecular species within a given feature may differ from the molecular species within the remaining features of the microarray. In one type of hybridization experiment, a sample solution containing radioactively, fluorescently, or chemoluminescently labeled molecules is applied to the active surface of the microarray. Certain of the labeled molecules in the sample solution may specifically bind to, or hybridize with, one or more of the different molecular species in one or more features of the microarray. Following hybridization, the sample solution is removed by washing the surface of the microarray with a buffer solution, and the microarray is then analyzed by radiometric or optical methods to determine to which specific features of the microarray the labeled molecules are bound. Thus, in a single experiment, a solution of labeled molecules can be screened for binding to hundreds or thousands of different molecular species that together compose the microarray. Microarrays commonly contain oligonucleotides or complementary deoxyribonucleic molecules to which labeled deoxyribonucleic acid and ribonucleic acid molecules bind via sequence-specific hybridization.

Generally, radiometric or optical analysis of the microarray produces a scanned image consisting of a two-dimensional matrix, or grid, of pixels, each pixel having one or more intensity values corresponding to one or more signals. Scanned images are commonly produced electronically by optical or radiometric scanners and the resulting two-dimensional matrix of pixels is stored in computer memory or on a non-volatile storage device. Alternatively, analog methods of analysis, such as photography, can be used to produce continuous images of a microarray that can be then digitized by a scanning device and stored in computer memory or in a computer storage device.

Figure 1:
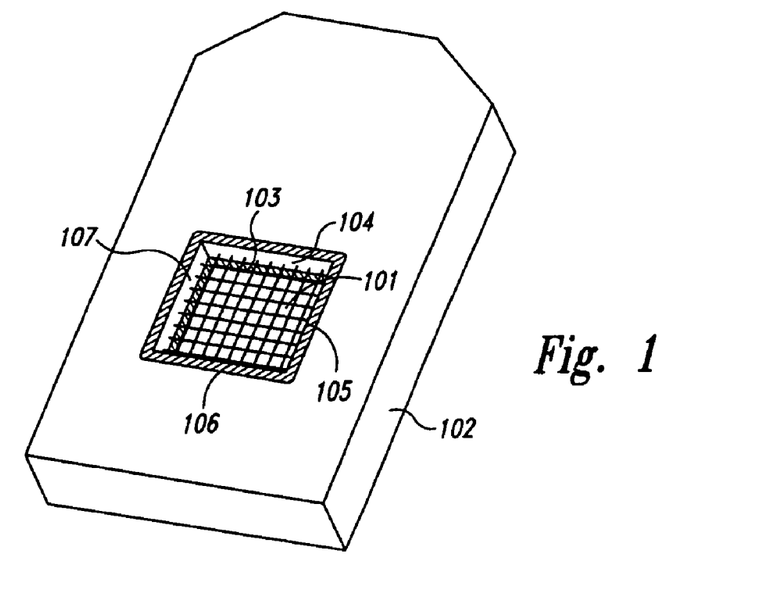
FIG. 1 shows a common, currently available commercial microarray packaged within a plastic housing.

Microarrays are often prepared on 1-inch by 3-inch glass substrates, not coincidentally having dimensions of common glass microscope slides. Commercial microarrays are often prepared on smaller substrates that are embedded in plastic housings. FIG. 1 shows a common, currently available commercial microarray packaged within a plastic housing. The microarray substrate 101 is embedded within the large, rather bulky plastic housing 102 to form an upper transparent cover over an aperture 103 within the plastic housing 102. The features that together compose the microarray are arranged on the inner, or downward surface of the substrate 101, and are thus exposed to a chamber within the plastic housing 102 comprising the microarray substrate 101 and the sides of the aperture 104–107. A transparent bottom cover may be embedded in the lower surface of the plastic housing to seal the chamber in order to create a small reaction vessel into which sample solutions may be introduced for hybridization with molecular species bound to the substrate of the microarray. Thus, the plastic housing serves to package the microarray and protect the microarray from contamination and mechanical damage during handling and storage and may also serve as a reaction chamber in which sample solutions are introduced for hybridization with features of the microarray. The plastic housing may further serve as a support for the microarray during optical or radiometric scanning of the microarray following exposure of the microarray to sample solutions. Scanning may, in certain cases, be carried out through the substrate of the microarray without a need to remove the microarray from the plastic housing.

Although currently commonly used and widely commercially available, the plastic microarray packaging shown in FIG. 1 has a number of disadvantages. First, it is necessary to seal the substrate of the microarray within the plastic housing to prevent exchange of liquids and vapors between the external environment and the reaction chamber formed by the substrate of the microarray, the plastic housing, and a bottom cover. Microarray substrates are commonly made from glass. Thus, a tight seal between the glass microarray substrate and the plastic housing is required. Unfortunately, many sealants used to seal glass to plastic may contain unreactive monomer or produce reactive surfaces that interfere chemically within the hybridization processes that need to be carried out within the reaction vessel. A second disadvantage is that glass and plastic exhibit different thermal expansion behaviors, creating high stress that may lead to glass-to-plastic bond failures during exposure of the plastic microarray packaging and embedded microarray to thermal fluctuations. A third disadvantage of the plastic packaging shown in FIG. 1 is that the plastic packaging is generally insufficiently mechanically stable to allow for reliable automated positioning of the microarray within a scanning device. As a result, scanning devices need an auto-focusing feature or other additional electromechanical systems for positioning the microarray within the scanning device. A fourth disadvantage of the plastic packaging shown in FIG. 1 is that, when the embedded microarray is scanned without removing the microarray from the plastic packaging, the thickness of the microarray substrate or of the lower transparent cover, depending from which side of the package the microarray is scanned, must have a relatively precise and uniform thickness so that the microarray substrate or bottom cover is not a source of uncontrolled error during the scanning process. Manufacturing either the microarray substrate or bottom cover to the required precision and uniformity adds to the cost of the microarray/plastic housing module. In general, fully automated manufacture of the plastic housing and embedded microarray is both complex and difficult. A final disadvantage of the plastic packaging for the microarray shown in FIG. 1 is that the microarray/plastic housing module is primarily designed for individual handling, and lacks features that would facilitate automated positioning, hybridization, and scanning of the microarray/plastic housing modules.

In order to address the above described deficiencies of the commonly used plastic microarray housing shown in FIG. 1, microarray strips have been developed. A microarray strip is a linear sequence of regularly-spaced, tightly sealed reaction chambers that each contains a precisely positioned and oriented microarray. The microarray strip further includes tractor feed perforations or other regularly spaced mechanical or optical features that allow the microarray strip, and the microarray contained within the microarray strip, to be mechanically translated and precisely positioned within various automated electromechanical systems. A microarray strip may also serve as a sequence of economical and reliable storage chambers and as packaging for storing, handling, and transporting microarrays contained within the microarray strip. The microarray strip may be rolled onto drums for compact and reliable storage of microarrays.

Figure 2:
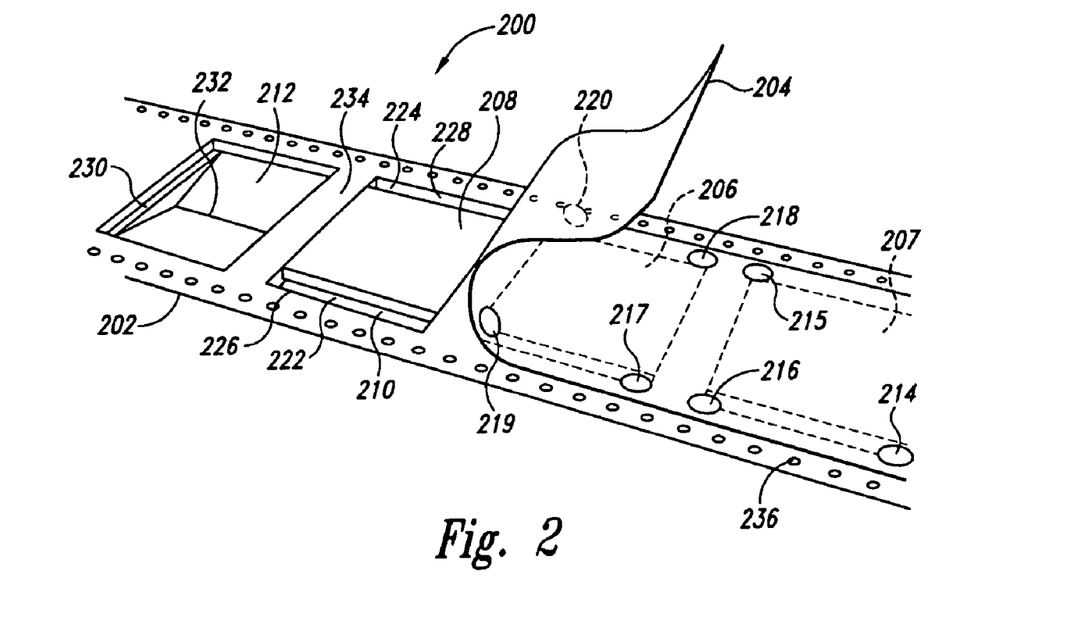
FIG. 2 shows a microarray strip.

FIG. 2 shows a microarray strip. The microarray strip 200 comprises a pocket strip 202 and cover strip 204. The microarray strip 200 in FIG. 2 is shown during manufacture as the cover strip 204 is being laid down along the top surface of the pocket strip 202 to create sealed reaction chambers 206–207. A microarray 208 has been inserted into a pocket 210 of the pocket strip 202 which will be next covered by the cover strip 204 during the manufacturing process. An additional empty pocket 212, into which a next microarray will be placed, is located to the left of pocket 210 containing microarray 208. Membrane septa 214–220 are affixed to the cover strip 204 over corner regions of the sealed reaction chambers 206 and 207 to provide resealable ports through which solutions can be introduced into, and extracted from, the sealed reaction chambers. The septa are positioned above two elongated wells 222 and 224 formed by gaps between edges of an embedded microarray 208 and the sides of a pocket 226 and 228. Note that each microarray is positioned to rest on two ledges 230 (second ledge obscured in FIG. 2) to leave a gap between the microarray and the bottom 232 of the pocket in which the microarray is placed. The two linear wells 222 and 224 and the gap between the bottom active surface of the microarray and the bottom of the pocket 232 form a single continuous volume within the pocket. The ledges 230 may be designed so that the top surface of the microarray is flush with the upper surface of the pocket strip 234 or, alternatively, may be designed so that the upper surface of the microarray is recessed within each pocket to leave a gap between the upper surface of the microarray and the cover strip 204 following heat sealing of the cover strip 204 to the pocket strip 202. Generally, the active surface of the embedded microarrays, to which features are bonded, is positioned downward, and is opposite from the side of the microarray adjacent to the cover strip in the sealed reaction chambers. Both edges of the pocket strip contain a linear, regularly-spaced sequence of tractor feed perforations such as tractor perforation 236. These perforations can be enmeshed with gear-like feed rollers of various different mechanical systems to allow for automated translation of the microarray strip in a direction parallel to the length of the microarray strip and can also provide for precise mechanical positioning of the embedded microarrays within a scanning device.

Many types of microarray strips can be designed and manufactured, and many different types of materials may be employed. For example, the pocket strip and cover strip may be made from acrylonytrile-butodiene-styrene ("ABS") plastic and can be continuously manufactured via a vacu-form process. The ABS pocket strip and cover strip can be readily heat sealed to provide a reasonably liquid-and-vapor-impermeable barrier. Alternatively, the cover strip may be sealed to the pocket strip via an adhesive sealant or may be designed to allow for mechanical sealing by application of mechanical pressure. Alternatively, both the pocket strip and cover strip may be manufactured from a plastic/metal foil laminate or other materials that provide a more robust barrier to exchange of liquid and vapor between the sealed reaction chambers and the outside environment. The septa can be affixed either to the upper surface or to the lower surface of the cover strip, or can be embedded within the cover strip, and can be manufactured from many different types of materials. One type of septa are three-ply laminates comprising an interior elastomer layer sandwiched between two polyester layers.

Although many of the deficiencies identified above for the commonly available plastic microarray housing shown in FIG. 1 are resolved by the newer microarray strip technology shown in FIG. 2, problems can arise in microarray strips due to small gaps between the bottom active surfaces of the microarrays and the bottoms of the pockets that contain them. Because solution in this gap is relatively immobilized by surface tension effects, mixing and circulating solutions within the pockets to thoroughly expose the active surfaces of microarrays to the solutions can be a difficult task. One technique is to introduce air bubbles into the gaps, and move, rotate, or shake the microarray strips to cause the bubbles to move within the gaps. When a bubble moves within a gap, solution is displaced, and mixing occurs. However, bubble movement within the solution is often accompanied by laminar flow within the solution, which, lacking vortices and other solution-mixing phenomena, does not lead to efficient mixing and circulation. More problematic is that the solution conformation of biopolymers can be disrupted at air/solution interfaces, so that the presence of a moving bubble can lead to denaturation of both solvated and bound molecules. This technique is also difficult to apply in a controlled manner, due to difficulties in guaranteeing well-distributed patterns of bubble movement within the gaps. For these reasons, designers, manufacturers, and users of microarray strips have recognized a need for a method and system for efficient microarray strip solution circulating and mixing.

SUMMARY OF THE INVENTION

One embodiment of the present invention is a microarray strip pocket with roll pump features that together compose a roll pump within the microarray strip pocket. A roll pump circulates and mixes solution contained in the gap between the active surface of a microarray positioned within the microarray strip pocket and the bottom, inner surface of the microarray strip pocket. The roll pump features include shallow and deep vertical wells that contain equal levels of solution when the microarray strip is level. The shallow and deep vertical wells, the gap between the active surface of a microarray and the bottom, inner surface of the microarray strip pocket, and a gap between the surface of an inclined feature connecting the vertical wells and a cover strip form a continuous volume, or space, within the reaction chamber formed when the cover strip is bonded to the pocket strip. As the microarray strip is rotated about an axis perpendicular to the edges of the microarray strip and in a plane parallel to the broad surfaces of the microarray, solution moves from the deep vertical wells into the gap between the active surface of a microarray and the bottom, inner surface of the microarray strip, and, as a result, solution is displaced from the gap to the shallow vertical wells. The displaced solution flows from the shallow vertical wells along the inner surface of the cover strip and back to the deep vertical wells as rotation about the axis continues. With each complete rotation, a volume of solution determined, in part, by the height of the solution level in the deep vertical wells passes through the gap between the active surface of a microarray and the bottom, inner surface of the microarray strip. By continuously rotating the microarray strip, solution is circulated through the gap and mixed within the gap.

DETAILED DESCRIPTION OF THE INVENTION

One embodiment of the present invention is a roll pump included within a reaction chamber of a microarray strip. The roll pump comprises features molded into the pocket, including two deep vertical wells and two shallow vertical wells that are interconnected with gaps below a microarray positioned within the reaction chamber and between the wells and a cover strip that forms the top of the reaction chamber. As the microarray strip is rotated about a horizontal axis perpendicular to the edges of the microarray strip, solution continuously flows from the deep vertical wells into a gap between the active surface of a microarray and the bottom, inner surface of the reaction chamber, from the gap between the active surface of a microarray and the bottom, inner surface of the reaction chamber into the shallow vertical wells, and from the shallow vertical wells, along the inner surface of the cover strip, back to the deep vertical wells. The continuous flow of solution through the gap between the active surface of a microarray and the bottom, inner surface of the reaction chamber results in circulation and mixing of solution within the gap, thoroughly exposing the active surface of the microarray to the solution contained within the reaction chamber.

Figure 3:
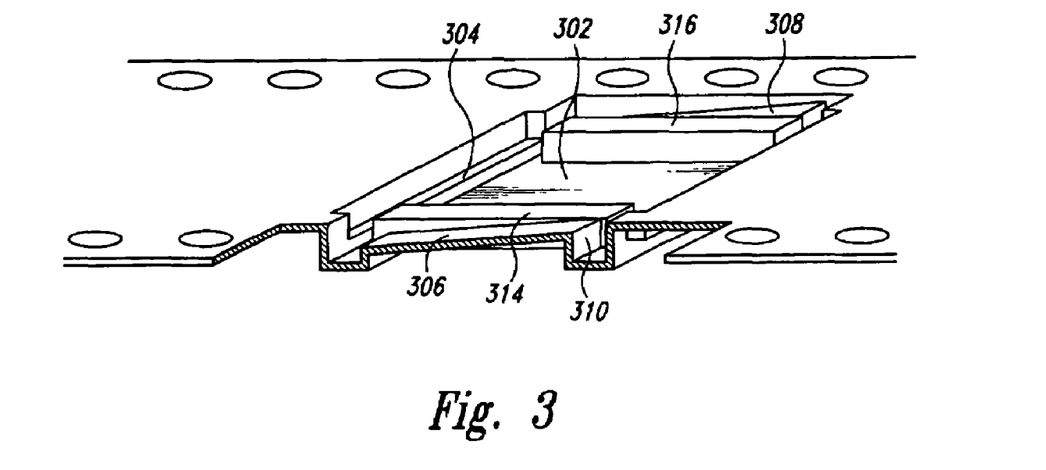
FIG. 3 illustrates an empty pocket within a microarray strip that includes roll pump features.

FIG. 3 illustrates a pocket within a microarray strip that includes roll pump features. The pocket 302, shown in a partial cutaway view, includes two ledges 304 (second ledge obscured in FIG. 3) on which the microarray substrate is placed. The pocket additionally contains two ramp features 306 and 308 that each form gutter dams 310 and 312. The ramp features are adjacent to two elongated rectangular box-like features 314 and 316.

Figure 4:
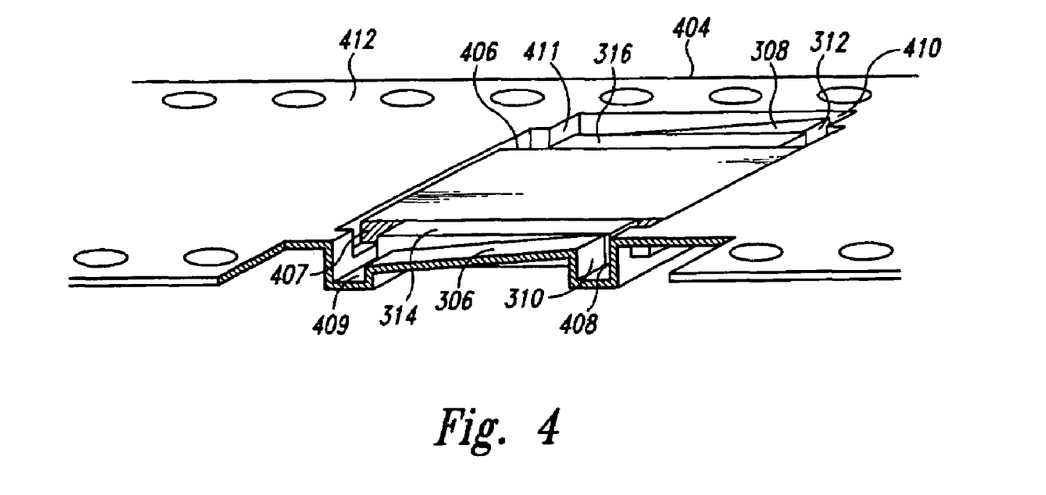
FIG. 4 shows the pocket illustrated in FIG. 3 following insertion of a microarray.

FIG. 4 shows the pocket illustrated in FIG. 3 following insertion of a microarray. In FIG. 4, the microarray 402 has been positioned to rest on top of the ledges (304 in FIG. 3) molded into the sides of the pocket perpendicular to the edge 404 of the pocket strip. The edges of the microarray 406–407 parallel to the edge of the pocket strip 404 are flush with the interior faces of the elongated rectangular features 316 and 314, respectively. A cover strip can be heat sealed or otherwise fastened to the elongated rectangular features 316 and 314 in order to prevent solution from entering a gap between the top surface of the microarray and the cover strip. The ramp features 306 and 308, following insertion of the microarray, provide two vertical wells 408–409 and 410–411 on each side of the microarray 406–407 parallel to the edge of the pocket strip 404. The right-hand vertical wells 408 and 410 are deeper than the shallow, left-hand vertical wells 409 and 411. The depth of the right-hand vertical wells 408 and 410 result from gutter dams 310 and 312, respectively. There are gaps between the bottom surface of the microarray 406 and the bottom of the pocket (302 in FIG. 3) and between the top of the ramp features 306 and 308 and the surface 412 of the pocket strip. Once the cover strip is bound to the surface 412 of the pocket strip, producing an enclosed reaction chamber around the microarray, the vertical wells 408–411, gaps below the bottom surface of the microarray and above the gutter ramps 306–308 form a continuous volume around the microarray substrate.

Figure 5A:
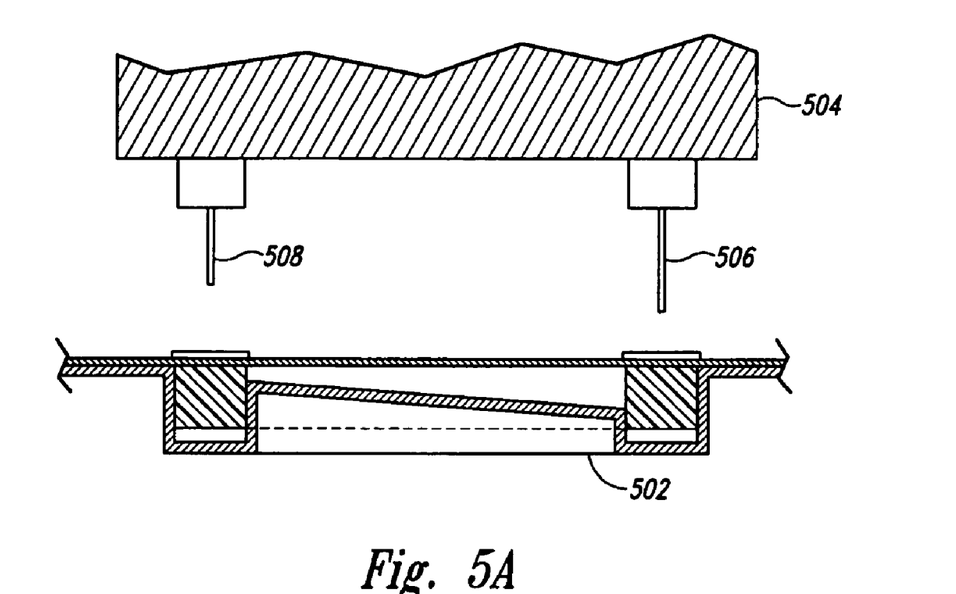
FIGS. 5A–5B illustrate introduction of a sample solution into a reaction chamber of a microarray strip that includes roll pump features.
Figure 5B:
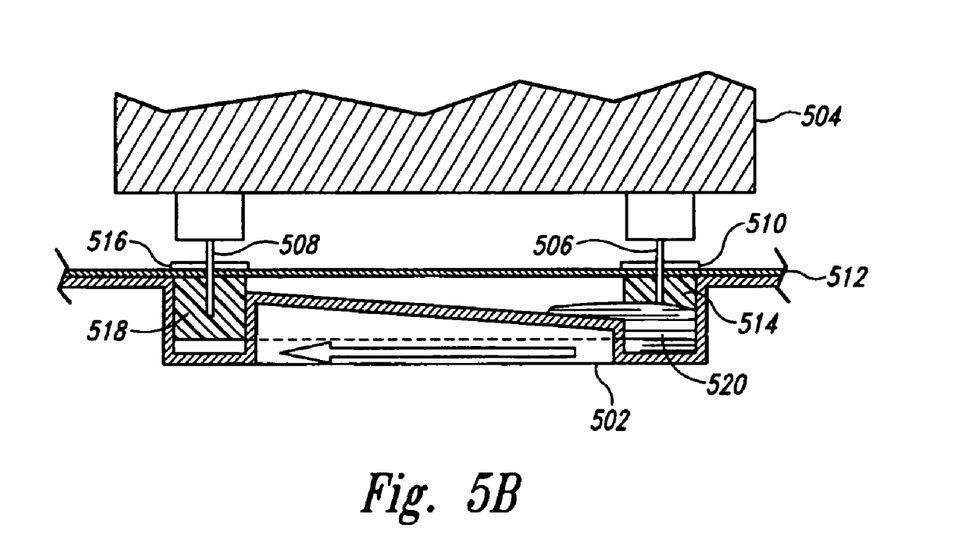

FIGS. 5A–5B illustrate introduction of a sample solution into a reaction chamber of a microarray strip that includes roll pump features. In FIG. 5A, a reaction chamber 502, shown in cross section, is positioned below a sample-introducing machine 504 that includes a pipette tube 506 and a vent tube 508. In FIG. 5B, the sample-introducing machine 504 has been lowered towards the reaction chamber 502 so that the pipette tube 506 has pierced the septum 510 and cover strip 512 directly above a deep vertical well 514 and the vent tube 508 has pierced a septum 516 and a cover strip 512 at a position directly above a shallow vertical well 518. Sample solution 520 has flowed through the pipette tube 506 from the sample-introducing machine 504 into the vertical well 514, and air or liquid displaced by the introduced sample solution 520 has been removed from the reaction chamber 502 via vent tube 508. During automated hybridization processes, the sample-introducing machine 504 may move back and forth between sample vessels or microtitre plates and reaction chambers of a microarray strip positioned via the tractor feed perforations or other alignment features to receive a sample solution from the sample-introducing machine.

Figure 6:
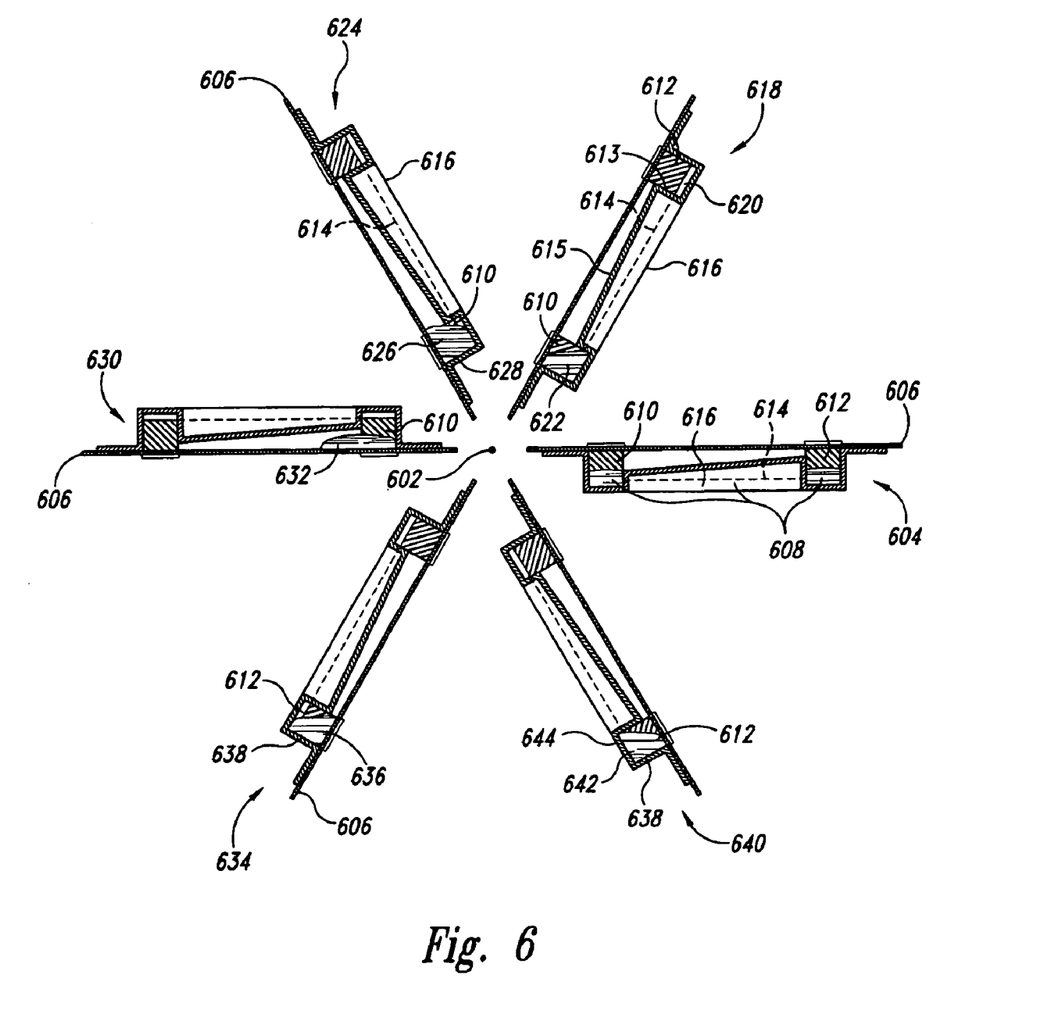
FIG. 6 illustrates operation of a roll pump during rotation of a microarray strip reaction chamber.

FIG. 6 illustrates operation of the roll pump that represents one embodiment of the present invention. The roll pump operates when a reaction chamber that incorporates roll pump features is rotated about an axis in a plane parallel to the plane of the microarray and perpendicular to the edges of the pocket strip and cover strip of the microarray strip containing the reaction chamber. In FIG. 6, the cross-section of a reaction chamber is shown in six orientations during rotation of the reaction chamber about an axis 602 (shown in cross-section in FIG. 6) in the plane of the cover strip and perpendicular to the edges of the cover strip and pocket strip. The reaction chamber in a first position 604 is level with the cover strip 606 oriented upward. Sample solution 608 is present in both the shallow vertical well 610 and the deep vertical well 612 and underneath the microarray and in contact with the active surface of the microarray. The active surface of the microarray is represented by dotted line 614 in FIG. 6. Sample solution is drawn into and held in the gap between the active surface 614 of the microarray and the bottom 616 of the reaction chamber by capillary action.

The reaction chamber is rotated counterclockwise about horizontal rotation axis 602. At position 618, the reaction chamber is tilted upward, with the deep vertical well 612 higher than the shallow vertical well 610. In this orientation, the sample solution that occupied the deeper vertical well 612 when the reaction chamber was in the first, horizontal position 604 has, for the most part, seeped into the gap between the active surface of the microarray 614 and the bottom of the reaction chamber 616, with sample solution that, in the first horizontal position 604, previously occupied the gap between the active surface of the microarray and the bottom of the reaction chamber, displaced by the sample solution from the deep vertical well into the shallow vertical well 610. Solution is prevented from flowing directly from the deep vertical well 612 to the shallow vertical well 610 by the gutter dam 613 formed from ramp feature 615. Note that, in the first, horizontal position 604, equal volumes of sample solution occupy both vertical wells 610 and 612. However, in the first tilted position 618, only a small amount 620 of sample solution remains in the deeper vertical well 612 while a greater amount 622 of sample solution now occupies the shallow vertical well 610. The solution moves through the gap between the active surface of the microarray and the bottom of the reaction chamber under gravitational force due to the tilting of the reaction chamber. Thus, bulk flow of solution through the gap is effected, although the gap is completely filled with solution during rotation, held in place by surface tension.

As rotation of the reaction chamber in a counterclockwise direction about the horizontal rotation axis 602 continues, the reaction chamber reaches a third, tilted and inverted position 624. In this position, the sample solution 626 occupying the shallow vertical well 610 is resting primarily on a side of the shallow vertical well 628 and on the inner surface of the cover strip 606. Note that, in the third position 624, sample solution remains in the gap between the active surface of the microarray 614 and the bottom of the reaction chamber 616.

As rotation continues about the horizontal axis 602 in a counterclockwise direction, the reaction chamber reaches a fourth, horizontal and inverted position 630. In the fourth position, the sample solution 632, formerly pooled within the shallow vertical well 610, is resting entirely on the inner surface of the cover strip 606. No longer confined within the vertical well 610, the sample solution 632 appears flattened as it spreads out across the surface of the cover strip 606.

As rotation about the horizontal axis 602 continues in a counterclockwise direction, the reaction chamber reaches a fifth position 634 in which the reaction chamber remains inverted and is tilted downward. In this fifth position 634, the droplet of sample solution 636 that rested in the fourth position on the inner surface of the cover strip below the inverted shallow vertical well 610, has flowed downward along the inner surface of the cover strip 606 and pooled in a wedge-shaped volume formed by a side 638 of the deep vertical well 612 and the inner surface of the cover strip 606.

As rotation of the reaction vessel continues in a counterclockwise direction, the reaction vessel reaches a sixth, downward-tilted position 640. In this position, the droplet of sample solution 642 has shifted to occupy a wedge-shaped volume bounded by the bottom surface 644 of the deep vertical well 612 and a side 638 of the deep vertical well.

Finally, as rotation of the reaction vessel continues in a counterclockwise direction about the horizontal axis 602, the reaction vessel returns to the first, level and upright position 604, described above. As the reaction chamber is rotated into this position, pooled sample solution within the deep vertical well 612 flows into the gap between the active surface 614 of the microarray and the bottom 616 of the reaction vessel displacing sample solution from that gap to the shallow vertical well 610.

Thus, following a complete 360° rotation of the reaction vessel about the horizontal rotation axis 602, sample solution has flowed from the vertical well 612 into the space between the active surface of the microarray 614 and the bottom 616 of the reaction vessel, and displaced sample solution from that space has been displaced into the shallow vertical well 610 and has flowed from the shallow vertical well 610 along the inner surface of the cover strip 606 back to the deep vertical well 612. Continuous rotation of a reaction vessel in the fashion illustrated in FIG. 6 produces many cycles of solution exchange between the vertical wells 610 and 612 and the gap between the active surface of the microarray 614 and the bottom of the reaction vessel 616.

Although the present invention has been described in terms of a particular embodiment, it is not intended that the invention be limited to this embodiment. Modifications within the spirit of the invention will be apparent to those skilled in the art. For example, many different constellations of roll pump features may be used to create the deep and shallow vertical wells at opposite ends of each side of the reaction chamber. In an alternate embodiment, no gutter ramp connects the two wells. In still another embodiment, vertical wells may be included along only one side of the reaction vessel, rather than both sides, as shown in the described embodiment. The sizes and shapes of the vertical wells and gap between the active surface of the microarray and bottom of the reaction vessel may vary considerably, and may be selected to accommodate desired volumes of solutions in the vertical wells and in the space between the active surface of the microarray and the bottom of the reaction vessel. In another embodiment, only a single vertical well at one end of the reaction chamber may be included, with displaced sample solution simply pooling around and above the microarray substrate at the opposite end of the reaction chamber. In still another embodiment, two spaces at either end of the reaction chamber, joined via the capillary gap underneath the microarray, and a gap between the microarray and the cover strip may constitute a roll pump. While the inclined-ramp gutter dam feature serves, in the described embodiment, as a type of one-way valve, or channeling mechanism, other types of one-way valves, or channeling mechanisms, may be employed in alternate embodiments to direct solution from one side of the reaction chamber into the capillary gap underneath the microarray. The pocket of a microarray strip including roll pump features may be manufactured from many different types of materials, including synthetic polymers, polymer/metal foil laminates, metals, ceramics, and other materials. Because microarray strips can be conveniently rolled onto reels, the rotation required to activate the roll pumps of reaction chambers within a microarray strip and be applied to a reel containing a rolled-up microarray strip. Although the described embodiment concerned a roll pump incorporated within the reaction chamber of a microarray strip, roll pumps within the scope of the present invention may be employed within other types of microarray packaging and reaction chamber systems, including individual plastic housings. Reaction chambers enclosing other types of reactive entities, other than microarrays, may also include a roll pump according to the present invention. For example, a substrate with a uniform reactive coating or surface may be more effectively exposed to a solution via a roll pump. Finally, a roll pump may be included within any enclosed region for circulation of solution within the region.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A method comprising:
   providing a first well near a first side of a reaction chamber comprising a bottom surface and walls, the first side parallel to a rotation axis about which the reaction chamber is rotated;
   positioning a reactive entity within the reaction chamber so that there is a gap between a lower surface of the reactive entity and the bottom surface of the reaction chamber;
   introducing solution into the first well and gap between the lower surface of the reactive entity and the bottom surface of the reaction chamber; and
   rotating the reaction chamber so that solution moves from the first well into the gap between the lower surface of the reactive entity and the bottom surface of the reaction chamber, from the gap between the lower surface of the reactive entity and the bottom surface of the reaction chamber to a second side of the reaction chamber parallel with the rotation axis, and from the second side of the reaction chamber along the inner top surface of the reaction chamber to the first well.

2. The method of claim 1 further including providing a second well near a second side of the reaction chamber, into which solution moves from the gap between the lower surface of the reactive entity and the bottom surface of the reaction chamber and from which solution moves back to the first well as the reaction chamber is rotated.

3. The method of claim 2 further including providing a third well near the first side and a fourth well near the second side.

4. The method of claim 3 further including providing two inclined ramps, one that interconnects the first and second wells, and another that interconnects the third and fourth wells, the inclined ramps at opposite edges of the reaction chamber perpendicular to the axis of rotation.

5. The method of claim 1 wherein the reactive entity is a microarray.

6. The method of claim 1 wherein the solution is a hybridization solution.

7. A method of moving a fluid within a reaction chamber, said method comprising:
   introducing a fluid into said reaction chamber, wherein said reaction chamber comprises a roll pump and a reactive entity that is a microarray of molecular species; and
   rotating said reaction chamber about a rotation axis perpendicular to an edge of said reactive entity so that said roll pump provides for continuous fluid flow in said reaction chamber, wherein said roll pump comprises; a shallow vertical well connected to a deep vertical well by an inclined feature.

8. The method according to claim 7, wherein said molecular species are nucleic acids.

9. The method according to claim 7, wherein said rotating is continuous.

10. The method according to claim 7, wherein said fluid is a sample.

11. The method according to claim 7, wherein said fluid is a wash fluid.

12. A method of moving a fluid within a reaction chamber, said method comprising:
    introducing a fluid into said reaction chamber, wherein said reaction chamber comprises a roll pump; and
    rotating said reaction chamber about a rotation axis so that said roll pump provides for continuous fluid flow in said reaction chamber, wherein said roll pump comprises: a shallow vertical well connected to a deep vertical well by an inclined feature and said fluid comprises labeled molecules.

13. The method according to claim 12, wherein said labeled molecules are fluorescently labeled.

14. A method of moving a fluid within a reaction chamber comprising a nucleic acid microarray, said method comprising:
    introducing a fluid into said reaction chamber, wherein said reaction chamber comprises a roll pump; and
    rotating said reaction chamber about a rotation axis so that said roll pump continuously moves fluid over an active surface of said nucleic acid array, wherein said roll pump comprises: a shallow vertical well connected to a deep vertical well by an inclined feature.

15. The method according to claim 14, wherein said rotation axis is perpendicular to an edge of said nucleic acid microarray.

16. The method according to claim 14, wherein said rotating is continuous.

17. The method according to claim 14, wherein said fluid is a sample.

18. The method according to claim 14, wherein said fluid is a wash fluid.

19. The method according to claim 14, wherein said fluid comprises labeled molecules.

20. The method according to claim 19, wherein said labeled molecules are fluorescently labeled.

* * * * *

UNITED STATES PATENT AND TRADEMARK OFFICE
CERTIFICATE OF CORRECTION

PATENT NO. : 7,052,880 B2 Page 1 of 1
APPLICATION NO. : 10/837334
DATED : May 30, 2006
INVENTOR(S) : McEntee It is certified that error appears in the above-identified patent and that said Letters Patent is hereby corrected as shown below:

Column 10, line 4, in Claim 7, after "comprises" delete ";" and insert -- : --, therefor.

Signed and Sealed this

Twenty-eighth Day of November, 2006

JON W. DUDAS
*Director of the United States Patent and Trademark Office*